United States Patent
Evevsky

(10) Patent No.: US 8,077,337 B2
(45) Date of Patent: Dec. 13, 2011

(54) METHOD AND SYSTEM FOR PROCESSING RETURN FAX DOCUMENT DELIVERIES

(75) Inventor: Nick Evevsky, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 929 days.

(21) Appl. No.: 12/058,086

(22) Filed: Mar. 28, 2008

(65) Prior Publication Data

US 2009/0244638 A1  Oct. 1, 2009

(51) Int. Cl.
*H04N 1/04* (2006.01)
(52) U.S. Cl. ........ 358/1.15; 358/402; 358/407; 358/440
(58) Field of Classification Search .................. 358/1.15, 358/402, 407, 440, 468; 709/217, 219
See application file for complete search history.

(56) References Cited

U.S. PATENT DOCUMENTS

| | | | | |
|---|---|---|---|---|
| 5,506,697 A | * | 4/1996 | Li et al. | 358/448 |
| 6,359,974 B1 | * | 3/2002 | Ishibashi | 379/100.06 |
| 6,903,838 B1 | * | 6/2005 | Hanson et al. | 358/1.15 |

* cited by examiner

*Primary Examiner* — Houshang Safaipour
(74) *Attorney, Agent, or Firm* — Ronald E. Prass, Jr.; Prass LLP

(57) ABSTRACT

A method and apparatus for processing return fax document deliveries is disclosed. The method may include receiving fax data for transmission to a first party, storing the received fax data, encoding a digital mark, creating fax image using the stored fax data and the encoded digital mark, transmitting the generated fax image to the first party, receiving a return fax image from the first party, the return fax image including the fax data and the encoded digital mark, decoding the digital mark, extracting any information on the return fax image that was added by the first party, and routing the return fax image with the stored fax data, the decoded digital mark, and the extracted additional information to at least one workflow recipient.

20 Claims, 4 Drawing Sheets

METHOD AND SYSTEM FOR PROCESSING RETURN FAX DOCUMENT DELIVERIES

BACKGROUND

Disclosed herein are a method and apparatus for processing return fax document deliveries, as well as corresponding apparatus and computer-readable medium.

A return fax workflow occurs when an individual returns an original Fax back to the sender. In conventional systems, this process is an open loop. Consequently, the receiving side does not know which faxes have been sent out. Therefore, on the return path, each document needs to be interrogated to determine its form, type and version, its customer, and priority.

Another issue is that when a fax is received, the only available delivery notification is the sheet that is optionally printed from the sender's fax machine. If the received fax has bad quality image, the sender will not likely discover that fact until a later time causing repeated faxing of the same faxed document. In addition, the conventional process also requires an extra piece of paper to be generated for each fax transmission which is usually discarded afterwards.

SUMMARY

A method and apparatus for processing return fax document deliveries is disclosed. The method may include receiving fax data for transmission to a first party, storing the received fax data, encoding a digital mark, creating fax image using the stored fax data and the encoded digital mark, transmitting the generated fax image to the first party, receiving a return fax image from the first party, the return fax image including the fax data and the encoded digital mark, decoding the digital mark, extracting any information on the return fax image that was added by the first party, and routing the return fax image with the stored fax data, the decoded digital mark, and the extracted additional information to at least one workflow recipient.

DETAILED DESCRIPTION

Figure 1:
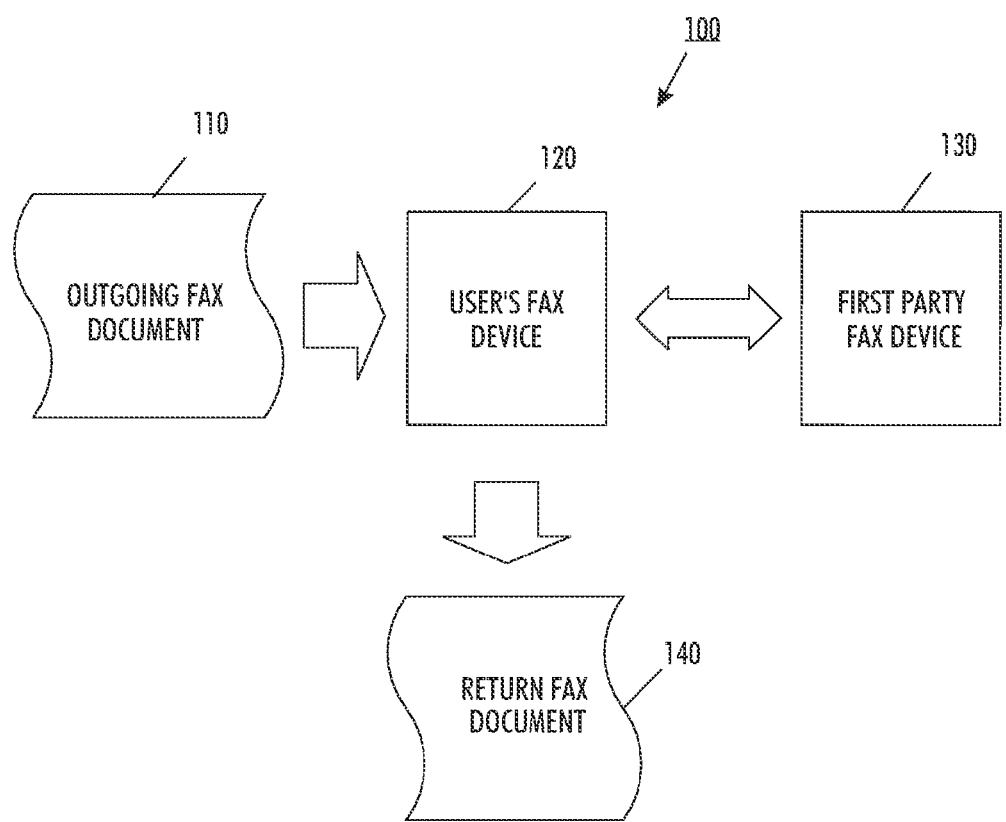
FIG. 1 illustrates a diagram of an exemplary return fax document delivery system in accordance with a possible embodiment of the disclosure.

Aspects of the embodiments disclosed herein relate to methods for processing return fax document deliveries, and corresponding apparatus and computer readable medium. The disclosed embodiments concern a closed loop fax process that may digitally encode the outbound fax process information with a digital mark on the fax. After receiving the fax, the receiving party may print, mark up, and sign the fax. Next, the receiving (or first) party may fax the completed document back to the sender.

After receiving of the incoming fax, the digital mark may be decoded and its data is appended to the fax. If there is a notification option enabled, a notification message may be sent to the receiving party through one or more preferred methods (e.g., return fax, email, etc). The incoming fax record may be updated noting that the confirmation was sent. Finally, the completed fax package may be delivered for final processing.

The disclosed embodiments include a method for processing return fax document deliveries. The method may include receiving fax data for transmission to a first party, storing the received fax data, encoding a digital mark, creating fax image using the stored fax data and the encoded digital mark, transmitting the generated fax image to the first party, receiving a return fax image from the first party, the return fax image including the fax data and the encoded digital mark, decoding the digital mark, extracting any information on the return fax image that was added by the first party, and routing the return fax image with the stored fax data, the decoded digital mark, and the extracted additional information to at least one workflow recipient.

The disclosed embodiments further include an apparatus that processes return fax document deliveries. The apparatus may include a fax data receiver that receives fax data for transmission to a first party and stores the received fax data, a digital mark decoder that decodes a digital mark, a fax image generator that generates a fax image using the stored fax data and the encoded digital mark and transmits the generated fax image to the first party, a fax data decoder that receives a return fax image from the first party, the return fax image including the encoded fax data and the encoded digital mark, decodes the received encoded fax data and the encoded digital mark, a first party data extractor that extracts any information on the return fax image that was added by the first party and routes the return fax image with the decoded received fax data, decoded digital mark, and the extracted additional information to at least one workflow recipient.

The disclosed embodiments further include a computer-readable medium storing instructions for controlling a computing device for processing return fax document deliveries. The instructions may include receiving fax data for transmission to a first party, storing the received fax data, encoding a digital mark, creating fax image using the stored fax data and the encoded digital mark, transmitting the generated fax image to the first party, receiving a return fax image from the first party, the return fax image including the fax data and the encoded digital mark, decoding the digital mark, extracting any information on the return fax image that was added by the first party, and routing the return fax image with the stored fax data, the decoded digital mark, and the extracted additional information to at least one workflow recipient.

FIG. 1 illustrates a diagram of an exemplary return fax document delivery system 100 in accordance with a possible embodiment of the disclosure. The exemplary return fax document delivery system 100 may include a user's fax device 120 that transmits an outgoing fax document 110 to a first party fax device 130. The first party's fax device 130 then transmits back a return fax document 140 to the user's fax device 120. The return fax document 140 may be signed, annotated, marked-up, etc. by the first party prior to returning. The user's fax device 120 automatically recognizes and processes the return fax document 140 to one or more processes or workflow recipients, for example.

The user's fax device 120 and the first party fax device 130 may represent any device that may send and receive fax documents, such as a fax machine, computer, server, multi-function device, personal digital assistant, etc., for example.

Note that the outgoing fax document 110 and the return fax document 140 may be in any form, including paper, electronic, etc., and may be presented in physical form or as an image on a monitor, screen, etc.

Figure 2:
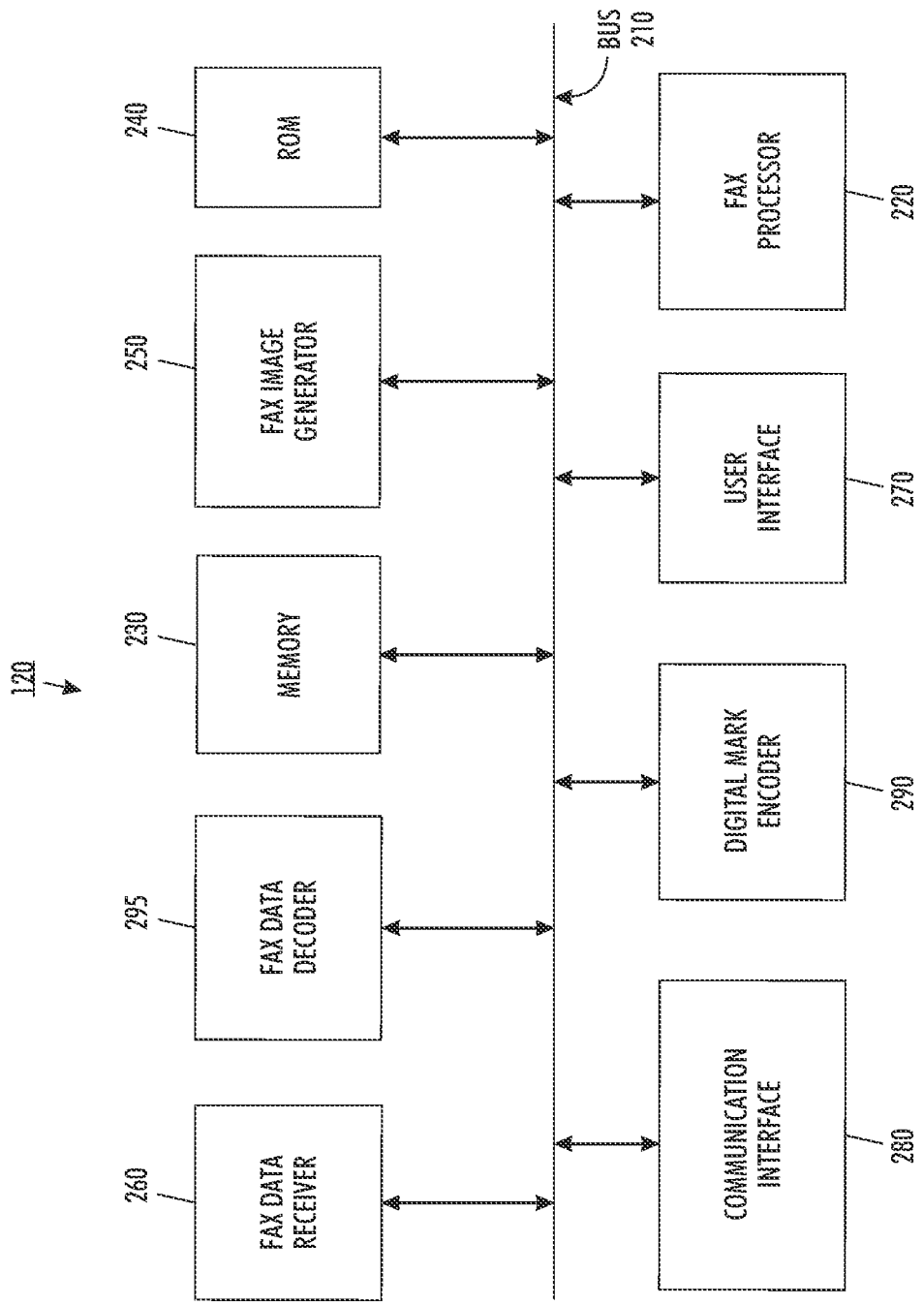
FIG. 2 illustrates a block diagram of an exemplary user's fax device in accordance with a possible embodiment of the disclosure.

FIG. 2 illustrates a block diagram of a user's fax device 120 in accordance with a possible embodiment of the disclosure. The user's fax device 120 may include may include a bus 210, a fax processor 220, a memory 230, a read only memory (ROM) 240, a fax image generator 250, a fax data receiver 260, a user interface 270, a communication interface 280, a digital mark encoder 290, and a fax data decoder 295. Bus 210 may permit communication among the components of the user's fax device 120.

Fax processor 220 may include at least one conventional processor or microprocessor that interprets and executes instructions. Memory 230 may be a random access memory (RAM or another type of dynamic storage device that stores information and instructions for execution by fax processor 220. Memory 230 may also include a read-only memory (ROM which may include a conventional ROM device or another type of static storage device that stores static information and instructions for fax processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for fax processor 220. A storage device may augment the ROM and may include any type of storage media, such as, for example, magnetic or optical recording media and its corresponding drive.

The user interface 270 may include one or more conventional input mechanisms that permit a user to input information, communicate with the marking device 100, and/or present information to the user, such as an electronic display, microphone, touchpad, keypad, keyboard, mouse, pen, stylus, voice recognition device, buttons, one or more speakers, etc. Output mechanisms for the user interface 270 may include one or more conventional mechanisms that output information to the user, including a display, a printer, one or more speakers, or a medium, such as a memory, or a magnetic or optical disk and a corresponding disk drive.

The fax image generator 250 may be an device that may generate a fax image from encoded fax data and a digital mark and transmit that generated image to a first party fax device 130. The fax data receiver 260 may be any device that may receive fax data for processing or storage.

The digital mark encoder 290 may represent any device that may encode a digital mark, bar code, dataglyph, or other mark that may distinguish fax document from each other in a manner that such a distinction may be made by a machine or other automated process. The fax data decoder 295 may be any device that may decode return encoded fax data and encoded digital marks for further processing or storage.

The user's fax device 120 may perform such functions in response to fax processor 220 by executing sequences of instructions contained in a computer-readable medium, such as, for example, memory 230. Such instructions may be read into memory 230 from another computer-readable medium, such as a storage device or from a separate device via communication interface 280.

The user's fax device 120 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the user's fax device 120, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Figure 3:
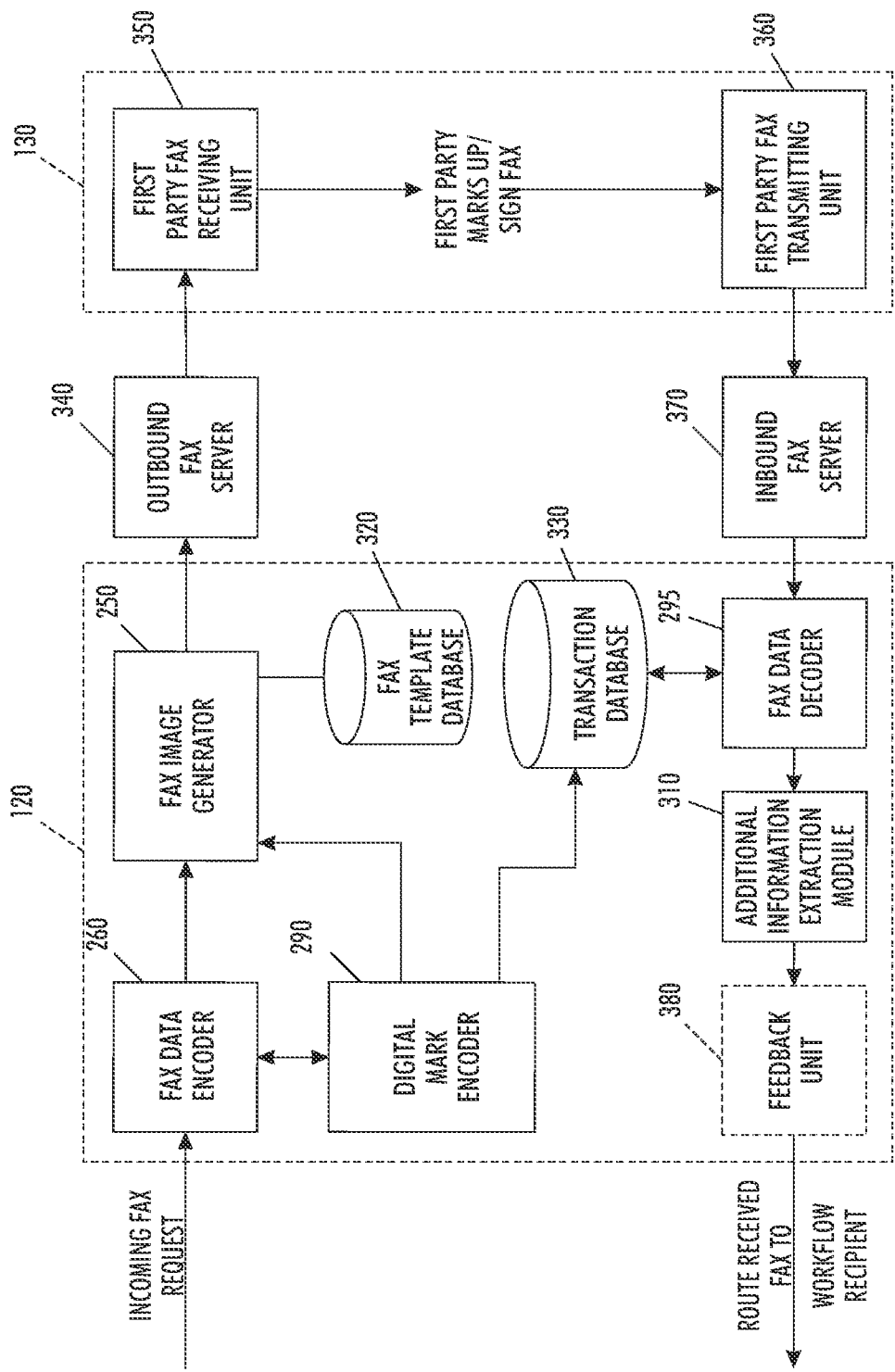
FIG. 3 illustrates a more detailed diagram of an exemplary return fax document delivery system in accordance with a possible embodiment of the disclosure.

FIG. 3 illustrates a more detailed diagram of an exemplary return fax document delivery system 300 in accordance with a possible embodiment of the disclosure. The exemplary return fax document delivery system 300 may include the user's fax device 120, the first party's fax device 130, incoming fax server 340, and outgoing fax server 370. The user's fax device 120 may include the fax image generator 250, the data encoder 260, the digital mark encoder 290, the data decoder 295, an additional information extraction module 310, a fax template database 320, a transaction database 330, and a feedback unit 380 (optional).

The first party's fax device 130 may include a first party fax receiving unit 350 and a first party fax sending unit 360. The first party fax receiving unit 350 and the first party fax sending unit 360 may be the same unit or embody separate units.

The outbound fax server 340 and the inbound fax server 370 may be part of the user's fax device 120 or may be separate units. In addition, the outbound fax server 340 and the inbound fax server 370 may be same server or different servers or other devices capable of sending and receiving fax documents.

As shown in FIG. 3, an incoming fax request with fax data may be received by the fax data receiver 260. The received fax data may be in the form of Fax Extensible Markup Language XML), for example.

The fax data receiver 260 may request a digital mark from the digital mark encoder 290. The digital mark encoder 290 may encode a digital mark and send the encoded digital mark to the fax image generator 250. The digital mark encoder 290 may store the transaction XML in the transaction database 330.

The digital mark encoder 290 may output a new XML to the fax image generator 250. The fax image generator 250 may generate a fax image from the received fax data (in the form of the new XML) and the encoded digital mark. The fax image generator 250 may generate the fax image freeform or using one or more fax templates from a fax template database 320.

The fax image generator 250 may output a portable document format (PDF) file of the generated fax image to an outbound fax server 340 for transmission to the first party's fax device 130. Alternatively, the fax image generator 250 may transmit the PDF file directly to the first party's fax device 130.

The outgoing fax document 110 may be received by the first party's fax receiving unit 350 of the first party's fax device 130. The first party's fax receiving unit 350 may route the received fax document to a first party recipient. The first party recipient may sign and/or mark-up the fax document so that it may be returned to the user's fax device 120. This signature/mark-up process may be manual or automatic, for example.

After the signature/mark-up process, the signed/marked-up fax may be sent to the first party fax transmitting unit 360. The first party fax transmitting unit 360 may transmit the return fax document 140 to the inbound fax server 370. Alternatively, the first party fax transmitting unit 360 may transmit the return fax document directly to the fax data decoder 295.

The inbound fax server 370 sends the return fax document 140 to the fax data decoder 295. The return fax document 140 may be transmitted to the fax data decoder 295 in the form of a Tagged Image File Format (TIFF) and XML file. The fax data decoder 295 decodes the fax data and digital mark from the return fax document 140. The fax data decoder 295 also retrieves transaction data concerning the return fax document 140 from the transaction database 330 to correlate the document with the original outgoing fax document 110.

The additional information extraction module 310 extracts any additional information added to the fax image by the first party, including notes, mark-ups, check marks, acknowledgements, etc. The extracted additional information and decoded fax data is then routed to one or more workflow recipient in the form of a TIFF and updated XML file to one or more workflow recipient. Optionally, the fax data decoder 295 may send the decoded fax data to a feedback unit 380. The feedback unit 380 may notify the first party that the return fax document was received.

Figure 4:
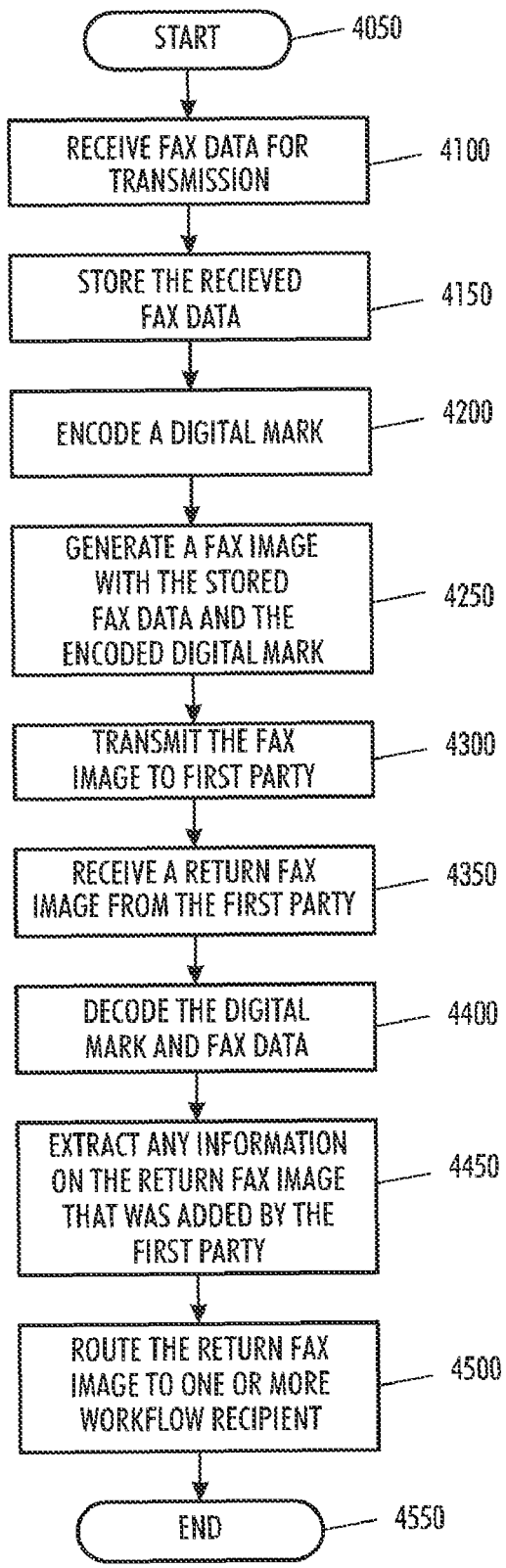
FIG. 4 illustrates a flowchart of an exemplary return fax document delivery process in accordance with a possible embodiment of the disclosure.

For illustrative purposes, the operation of the user's fax device 120 and in particular, the fax image generator 250, the fax data receiver 260, the digital mark encoder 290, the additional information extractor 310, the data decoder 295, and the return fax document delivery process, are described in FIG. 4 in relation to the block diagrams shown in FIGS. 1-3.

FIG. 4 illustrates a flowchart of an exemplary return fax document delivery process in accordance with a possible embodiment of the disclosure. The process begins at step 4050, and continues to step 4100 where the fax data receiver 260 may receive fax data for transmission to a first party. At step 4150, a fax data receiver 260 may store the received fax data.

At step 4200, the digital mark encoder 290 may encode a digital mark. The digital mark encoder 290 may send the encoded digital mark directly to the fax image generator 250 but may also store the encoded digital mark at least temporarily and the fax image generator 250 may then retrieve the stored encoded digital mark and add the encoded digital mark to the generated fax image.

In addition, the digital mark encoder 290 may store the transaction data in the transaction database 330. The fax data decoder 295 may then retrieve the stored transaction data from the transaction database 330 after receiving the return fax in order to verify the fax that was received, for example. The fax data decoder 295 may also register the return fax as being received in a log, as part of the fax data, a physical mark, etc., for example.

At step 4250, the fax image generator 250 may generate a fax image using the stored fax data and the encoded digital mark. The fax image generator 250 may generate the fax image as it is input or by using at least one fax template, for example. At step 4300, the fax image generator 250 may transmit the generated fax image to the first party.

At step 4350, the fax data decoder 295 may receive a return fax from the first party. The return fax may include the encoded fax data and the encoded digital mark. At step 4400, the fax data decoder 295 may decode the received the fax data and the encoded digital mark. At step 4450, the additional information extraction module 310 may extract any additional information added by the first party.

The feedback unit 280 may optionally provides feedback concerning the return fax to the first party. In this manner, the feedback unit 280 may provide feedback using at least one of a fax, telephone message, e-mail, letter, web portal message, Short Message Service (SMS) message, text message, or Really Simple Syndication (RSS) message.

At step 4500, the fax data decoder 295 may route the return fax with the decoded received fax data and decoded digital mark to at least one workflow recipient. The process may then go to step 4550 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing return fax document deliveries, comprising:
    receiving fax data for transmission to a first party;
    storing the received fax data;
    encoding a digital mark;
    creating fax image using the stored fax data and the encoded digital mark;
    transmitting the generated fax image to the first party;
    receiving a return fax image from the first party, the return fax image including the fax data and the encoded digital mark;
    decoding the digital mark;

extracting any information on the return fax image that was added by the first party; and routing the return fax image with the stored fax data, the decoded digital mark, and the extracted additional information to at least one workflow recipient.

2. The method of claim 1, further comprising:

providing feedback concerning the return fax image to the first party.

3. The method of claim 2, wherein the feedback is provided by at least one of fax, telephone message, e-mail, letter, web portal message, Short Message Service message, text message, and Really Simple Syndication message.

4. The method of claim 1, further comprising:

storing the encoded digital mark in a database;

retrieving the stored encoded digital mark from the database; and adding the encoded digital mark to the generated fax image.

5. The method of claim 1, further comprising:

storing transaction data; and retrieving the stored transaction data after receiving the return fax image.

6. The method of claim 1, wherein the return fax image is registered as being received.

7. The method of claim 1, wherein the fax image is generated using at least one fax template.

8. An apparatus that processes return fax document deliveries, comprising:

a fax data receiver that receives fax data for transmission to a first party and stores the received fax data;

a digital mark encoder that encodes a digital mark;

a fax image generator that generates a fax image using the stored fax data and the encoded digital mark and transmits the generated fax image to the first party;

a fax data decoder that receives a return fax image from the first party, the return fax image including the encoded fax data and the encoded digital mark, decodes the received encoded fax data and the encoded digital mark; and a first party data extractor that extracts any information on the return fax image that was added by the first party and routes the return fax image with the decoded received fax data, decoded digital mark, and the extracted additional information to at least one workflow recipient.

9. The apparatus of claim 8, further comprising:

a feedback unit that provides feedback concerning the return fax image to the first party.

10. The apparatus of claim 9, wherein the feedback unit provides feedback by at least one of fax, telephone message, e-mail, letter, web portal message, Short Message Service message, text message, and Really Simple Syndication message.

11. The apparatus of claim 8, wherein the digital mark encoder stores the encoded digital mark in a database and the fax image generator retrieves the stored encoded digital mark from the database, and adds the encoded digital mark to the generated fax image.

12. The apparatus of claim 8, wherein the digital mark encoder stores transaction data; and the fax data decoder retrieves the stored transaction data after receiving the return fax image.

13. The apparatus of claim 8, wherein the fax data decoder registers the return fax image as being received.

14. The apparatus of claim 8, wherein the fax image generator generates the fax image using at least one fax template.

15. A non-transitory computer-readable medium storing instructions for controlling a computing device for processing return fax document deliveries, the instructions comprising:

receiving fax data for transmission to a first party;

storing the received fax data;

encoding a digital mark;

creating fax image using the stored fax data and the encoded digital mark;

transmitting the generated fax image to the first party;

receiving a return fax image from the first party, the return fax image including the fax data and the encoded digital mark;

decoding the digital mark;

extracting any information on the return fax image that was added by the first party; and routing the return fax image with the stored fax data, the decoded digital mark, and the extracted additional information to at least one workflow recipient.

16. The non-transitory computer-readable medium of claim 15, further comprising:

providing feedback concerning the return fax image to the first party.

17. The non-transitory computer-readable medium of claim 16, wherein the feedback is provided by at least one of fax, telephone message, e-mail, letter, web portal message, Short Message Service message, text message, and Really Simple Syndication message.

18. The non-transitory computer-readable medium of claim 15, further comprising:

storing the encoded digital mark in a database;

retrieving the stored encoded digital mark from the database; and adding the encoded digital mark to the generated fax image.

19. The non-transitory computer-readable medium of claim 15, further comprising:

storing transaction data; and retrieving the stored transaction data after receiving the return fax image.

20. The non-transitory computer-readable medium of claim 15, wherein the return fax image is registered as being received.

* * * * *